May 20, 1958　　　　E. A. BARTLOW　　　　2,835,158
FUSIBLE WASHER WITH MEANS TO PROTECT THREADS
FROM MOLTEN METAL
Filed Feb. 1, 1956
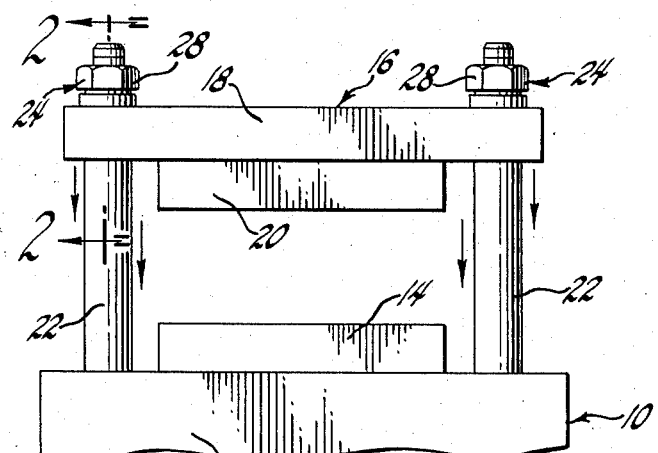
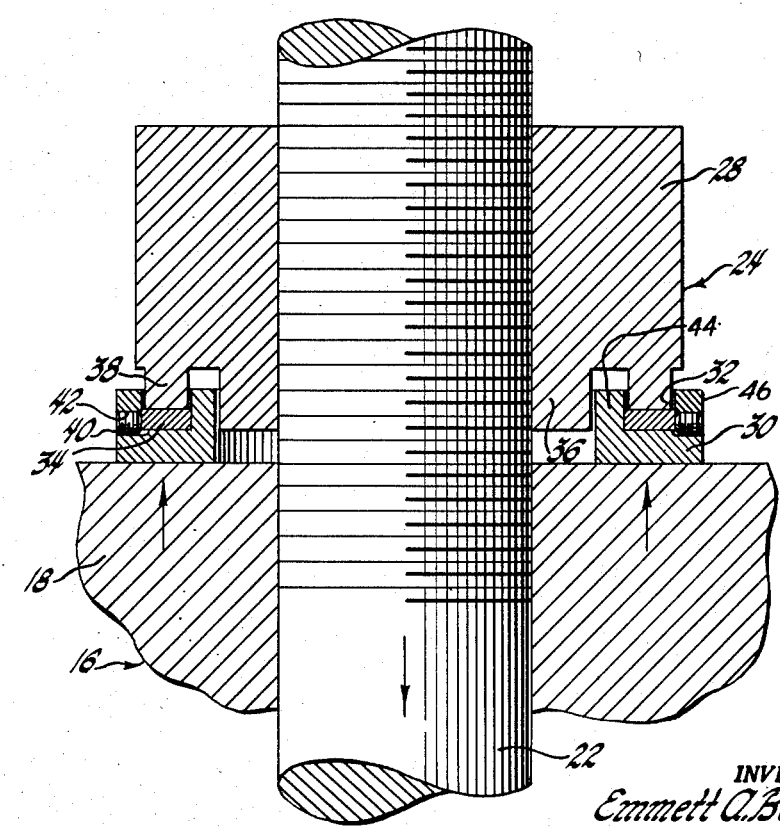
INVENTOR.
Emmett A. Bartlow
BY L. D. Burch
ATTORNEY

2,835,158

FUSIBLE WASHER WITH MEANS TO PROTECT THREADS FROM MOLTEN METAL

Emmett A. Bartlow, Columbus, Ohio, assignor to General Motors Corporation, Detroit, Mich., a corporation of Delaware Application February 1, 1956, Serial No. 562,753

2 Claims. (Cl. 85—50)

This invention relates to means facilitating the disassembly of members secured together and subjected to tensioning forces and has particular application to tensioned tie bolt means such as are used with stamping presses and other machines.

A particularly troublesome problem in stamping presses, which well illustrates the usefulness of this invention, is that of breaking loose a press ram held by a crankshaft locked in a bottom dead center position. In such a position the press forces normally applied to form sheet metal stampings reacts through the tie bolts securing the ram crosshead to the press base to tension such connecting bolts within their fastening means and make their disassembly practically impossible, other than by cutting or breaking away one of the securing means in order to relieve the tension.

Previous means of relieving the tension within a press locked in a dead center condition have included fusible bed plates within the die bed and fusible discs or plugs within the press ram connecting arm which could be melted away. However, following the relieving of tensioning forces by such means, the press was still required to be further disassembled in order to renew the fusible bed plate or plug before the press was able to continue operation.

It is now proposed to provide a fastener for use with tensioning means which includes means for relieving the tension and facilitating disassembly of the fastener. It is proposed to provide an assembly for retaining tie rods and the like which includes a fastener and a fusible spacer or washer which may be melted away upon the application of heat. The fusible member is preferably formed as an insert received within a recessed face of a washer member and adapted to have the fastener engaged therewith. The application of heat to the fusible member causes the member to melt away, reducing the spacing between the fastener and the work surface against which it acts to hold the tie rod tensioned and enabling the press ram, where so used, to be broken loose. Thereafter, only the fastener means of the tie rods need be replaced.

In the drawings:

Figure 1 is a simplified view of a stamping press employing this invention.

Figure 2 is an enlarged cross-sectioned view, taken in the plane of line 2—2 of Figure 1 looking in the direction of the arrows, showing the preferred embodiment of the proposed fastener means.

The stamping press 10 shown in the drawings include a die bed or base 12 having a die holder 14 thereon with the press ram 16, which includes the crosshead 18 and punch holder 20, supported thereover upon guide rods or tie bolts 22. The actuating mechanism of this press including the drive means, flywheel, crankshaft connection, etc. (not shown), is located below the die bed 12. In operation the press ram 16 is drawn down towards the die bed 12, with the guide rods 22, as shown by the arrows.

The press ram 16 is secured to the guide rods 22 by fastener means 24 engaged with the end of the guide rods or tie bolts 22.

The fastener means includes a threaded nut 28 received upon the threaded end of the tie rod means and washer or spacer means 30 received about the tie means and between the nut 28 and crosshead 18. The washer member 30 has one face thereof relieved to form a recess 32 within which is received a fusible insert 34. The nut 28 includes a collet 36 received within the washer member 30 and a projecting rib 38 received within the recess 32 and upon the insert 34. As illustrated in Figure 2 the recess 32 is defined by inner and outer walls 44, 46 and the width of the projecting rib 38 is substantially equal to the spacing between the inner and outer walls. Removable set screw plugs 40 are threaded within accesses 42 formed through the sides of the washer wall and communicating with the recess 32.

With the press 10 having the press ram locked in a bottom dead center condition, the guide rods 22 would be pulled down as the arrow on the rod shows in Figure 2, and the reactionary forces would act through the press ram 16 on the fastener assembly 24 as the other arrows indicate. With threaded fastener means such as are shown, the frictional forces on the threads would be next to impossible to overcome. However, by removing the plugs 40 and applying heat evenly to the ring 30, the fusible insert 34 melts and yields to reduce the spacing between the nut 28 and the work surface of crosshead 18 and relieve the tension upon the guide rods 22. The collet 36, aside from providing a longer threaded nut portion, prevents the flow of melted metal from the insert to the threaded parts of the nut and rod.

After the fusible insert has been melted down, the fastener may be readily removed, the crankshaft of the press may be rotated out of its dead center position and new fastener means may be immediately installed to place the press back in serviceable operation.

It will be appreciated that the fastener means proposed is far less expensive to replace than any other member of the press and that the use of such fastener means facilitates a much more easy and rapid repair of the press than other known means.

The claims:

1. A tension nut assembly including threaded nut means receiving a threaded shaft and engaging a work surface for tensioning said shaft, washer means interposed between said nut means and said work surface, said nut means including an annular projection and said washer means being formed to include an annular recess defined by inner and outer walls for receiving said projection with said inner wall interposed between said projection and said threaded shaft, a fusible insert within said recess for spacing said nut means apart from said work surface, said projection having a width substantially equal to the spacing between said inner and outer walls whereby said recess is closed off by said projection, and removable plug means provided within the outer wall of said washer means and communicating with said recess, said insert yielding upon removal of said plug means to the application of heat to reduce the spacing between said nut means and said work surface and to relieve the tension upon said shaft.

2. A tension nut assembly as defined by claim 1 wherein said nut member includes an internally threaded collet provided at one end thereof and said annular projection is formed concentrically about said collet and spaced apart therefrom, whereby the inner wall of said washer member is received concentrically about said collet such that said inner wall and collet provide a double wall protection against said insert when said insert yields upon the application of heat.

References Cited in the file of this patent

UNITED STATES PATENTS

| | | |
|---|---|---|
| 888,982 | Ette | May 26, 1908 |
| 994,892 | Tschudy | June 13, 1911 |
| 1,146,917 | Beckett | July 20, 1915 |
| 2,679,414 | Hornschuch | May 25, 1954 |
| 2,795,443 | Gratzmuller | June 11, 1957 |

FOREIGN PATENTS

| | | |
|---|---|---|
| 708,572 | Great Britain | May 5, 1954 |